United States Patent
Kikuchi et al.

(10) Patent No.: US 12,137,391 B2
(45) Date of Patent: Nov. 5, 2024

(54) TERMINAL DEVICE, MANAGEMENT SERVER, COMMUNICATION SYSTEM

(71) Applicant: KDDI CORPORATION, Tokyo (JP)

(72) Inventors: Yousuke Kikuchi, Tokyo (JP); Masahiro Daikoku, Tokyo (JP); Keisuke Tsuji, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 353 days.

(21) Appl. No.: 17/665,013

(22) Filed: Feb. 4, 2022

(65) Prior Publication Data

US 2022/0256311 A1 Aug. 11, 2022

(30) Foreign Application Priority Data

Feb. 10, 2021 (JP) .................................. 2021-019839

(51) Int. Cl.
*H04W 4/029* (2018.01)
*H04W 4/44* (2018.01)

(52) U.S. Cl.
CPC ............ *H04W 4/029* (2018.02); *H04W 4/44* (2018.02)

(58) Field of Classification Search
CPC ....... H04W 4/029; H04W 4/44; H04W 4/027; H04W 4/021; H04L 67/06
See application file for complete search history.

(56) References Cited

U.S. PATENT DOCUMENTS

| 10,091,621 B2 * | 10/2018 | Sonoda ................. H04W 4/027 |
| 2017/0366930 A1 | 12/2017 | Treman et al. |
| 2019/0258467 A1 | 8/2019 | Frantz et al. |

FOREIGN PATENT DOCUMENTS

| CN | 110213796 A | 9/2019 |
| JP | 2004-282456 A | 10/2004 |
| JP | 2006-108995 A | 4/2006 |
| JP | 2006-303643 A | 11/2006 |
| JP | 2006-304208 A | 11/2006 |

(Continued)

OTHER PUBLICATIONS

Office Action issued in corresponding Japanese Patent Application No. 2022-112823, dated Nov. 29, 2022.

(Continued)

*Primary Examiner* — Kabir A Timory
(74) *Attorney, Agent, or Firm* — Foley & Lardner LLP (57) ABSTRACT

A terminal device configured to communicate with a management server through a network is provided in association with a vehicle. The terminal device is configured to acquire the speed information representing the moving speed of the vehicle and the position information representing the position of the terminal device, to determine whether the position information represents the position located in a specific area which is determined in advance, and to download content from the management server when the position information indicates the position included in the specific area. Upon receiving the content information representing a capacity of the content downloadable from the management server, the terminal device may download the content corresponding to the content information according to a predetermined condition relating to a relationship between the speed information and the content information.

13 Claims, 5 Drawing Sheets

(56) References Cited

FOREIGN PATENT DOCUMENTS

JP    2008-294537 A    12/2008

OTHER PUBLICATIONS

Extended European Search Report corresponding to Application No. 22155421.5 dated Jul. 5, 2022 (9 pages).
Office Action in corresponding Japanese Patent Application No. 2021-019839, (with English translation) issued on Feb. 8, 2022, 10 pages.

* cited by examiner

| ID | GROUP | CONTENT NAME | DATE OF UPDATE | PRIORITY |
|---|---|---|---|---|
| 1 | Pull | 0xVR MOVING IMAGE | 2020/1/1 | 4 |
| 2 | Pull | OTA_ver1.2 | 2020/2/1 | 3 |

FIG. 5

| ID | GROUP | CONTENT NAME | DATE OF UPDATE | PRIORITY | SIZE |
|---|---|---|---|---|---|
| 1 | Pull | 0xVR MOVING IMAGE | 2020/1/1 | 4 | 3M |
| 2 | Pull | OTA_ver1.2 | 2020/2/1 | 3 | 500K |
| 3 | Push | REGIONAL STORE ADVERTISEMENT | 20201/2 | 5 | 1M |

FIG. 6

TERMINAL DEVICE, MANAGEMENT SERVER, COMMUNICATION SYSTEM

CROSS-REFERENCE TO RELATED APPLICATION

The present application claims the priority benefit of Japanese Patent Application No. 2021-19839 filed on Feb. 10, 2021, the subject matter of which is hereby incorporated herein by reference.

BACKGROUND OF THE INVENTION

1. Field of the Invention

The present invention relates to a terminal device, a management server, and a communication system.

2. Description of Related Art

Systems for receiving contents from servers with mobile bodies have been developed such that radio-access units are located in proximity to short-term spots at which mobile bodies are temporarily stopped and long-term spots at which mobile bodies are stopped for a long time, wherein it is possible to improve communication efficiency by receiving contents from different radio-access units according to the amount of data included in the contents. For example, Japanese Patent Application Publication No. 2006-303643 discloses a server and a system for providing contents to a mobile body using a first radio-access unit located at a short-term spot and a second radio-access unit located at a long-term spot such that the mobile body can receive contents from the second radio-access unit when an amount of data is above a predetermined threshold value while the mobile body can receive contents from the first radio-access unit when an amount of data is below the predetermined threshold value.

In the stage for locating radio-access units at various spots, however, it is difficult to determine in advance which spot the mobile body should pass through or which spot the mobile body should be temporarily stopped at or stopped at for a long time. For this reason, the number of times of performing handover will be increased between the mobile body and its serving radio-access units according to the behavior of the mobile body, which may deteriorate communication quality. In particular, this problem often arises in terminal devices mounted on vehicles when moving on roads.

The present invention is made in consideration of the aforementioned circumstances, and therefore the present invention aims to provide a terminal device mounted on a vehicle which can download contents while preventing degradation of communication quality. In addition, the present invention aims to provide a communication system using a management server to manage contents delivered to the terminal device mounted on a vehicle.

SUMMARY OF THE INVENTION

In a first aspect of the invention, a terminal device is configured to communicate with a management server through a network in association with a vehicle. The terminal device includes an acquisition unit configured to acquire speed information representing the moving speed of the vehicle and position information representing the position of the terminal device, a determination unit configured to determine whether the position information represents the position located in a specific area which is determined in advance, and a download unit configured to download content from the management server when the position information indicates the position included in the specific area. When the acquisition unit receives the content information representing a capacity of the content downloadable from the management server, the download unit is configured to download the content corresponding to the content information according to a predetermined condition relating to a relationship between the speed information and the content information.

Specifically, the acquisition unit includes a speed-information acquisition module configured to acquire the speed information of the vehicle, a position-information acquisition module configured to acquire the position information of the terminal device, and a content-information acquisition module configured to acquire the content information.

In the above, when the content information represents the capacity of each content among a plurality of contents, the download unit is configured to select at least one downloading content downloadable from the management server among a plurality of contents based on the speed information and the content information.

In this connection, the content information may include an estimated throughput when downloading the content. The download unit is configured to calculate an estimated moving time for the vehicle to move out of the specific area at the moving speed of the vehicle indicated by the speed information, and therefore the download unit is configured to select at least one downloading content having a capacity smaller than a result of multiplying the estimated moving time and the estimated throughput.

The specific area may allow the terminal device to continue its communication with the management server without causing handover, and therefore the download unit is configured to calculate the estimated moving time when the vehicle enters into the specific area.

In addition, the acquisition unit may further include a traffic-information acquisition module configured to acquire the traffic information representing the lighting status of a signal disposed on a road along which the vehicle moves and a stop instruction for stopping the vehicle indicated by the signal on the road. In this connection, the download unit is configured to calculate the estimated moving time of the vehicle as a duration of the stop instruction indicated by the signal on the road when the moving speed of the vehicle becomes lower than a predetermined threshold value.

The content information may include a priority for each content among a plurality of contents. In this connection, the download unit is configured to specify the at least one downloading content according to the capacity of each content and the priority indicated by the content information within a plurality of contents downloadable from the management server when the vehicle stays in the specific area.

Moreover, the terminal device may further include a list generation unit configured to generate a content list describing a plurality of contents scheduled to be downloaded from the management server, and a communication unit configured to transmit the content list to the management server. In this case, the content-information acquisition module is configured to acquire from the management server the content information representing the capacity for each content among a plurality of contents described on the content list.

Upon completion of downloading the content from the management server, the download unit is configured to transmit a throughput performance as a download time needed to completely download the content from the management server.

In a second aspect of the present invention, a management server is configured to communicate with a terminal device through a network in association with a vehicle. The management server includes a management storage unit configured to store content to be provided to the terminal device, and a management control unit configured to acquire from the terminal device the speed information representing the moving speed of the vehicle and the position information representing the position of the terminal device, to determine whether the position information represents the position located in a specific area which is determined in advance, and to provide the content to the terminal device according to a predetermined condition relating to a relationship between the speed information and a capacity of the content when the position information represents the position located in the specific area.

Specifically, the management control unit further includes a management acquisition module configured to acquire the speed information and the position information, a management determination module configured to determine whether the position information represents the position located in the specific area, and a content providing module configured to provide the content to the terminal device according to the predetermined condition.

In a third aspect of the present invention, a communication system includes a management server and a terminal device which are configured to communicate with each other through a network in association with a vehicle. The management server is configured to provide a content to the terminal device according to a request from the terminal device. The terminal device includes an acquisition unit configured to acquire the speed information representing the moving speed of the vehicle and the position information representing the position of the terminal device, a determination unit configured to determine whether the position information represents the position located in a specific area which is determined in advance, and a download unit configured to download the content from the management server when the position information indicates the position included in the specific area. When the acquisition unit is configured to receive the content information representing a capacity of the content downloadable from the management server, the download unit is configured to download the content corresponding to the content information according to a predetermined condition relating to a relationship between the speed information and the content information.

In a fourth aspect of the present invention, a non-transitory computer-readable storage medium is configured to store a program causing a computer serving as a terminal device configured to communicate with a management server through a network in association with a vehicle. The program implements a series of steps of: acquiring the speed information representing the moving speed of the vehicle and the position information representing the position of the terminal device, determining whether the position information represents the position located in a specific area which is determined in advance, downloading a content from the management server when the position information indicates the position included in the specific area, and upon receiving the content information representing a capacity of the content downloadable from the management server, downloading the content corresponding to the content information according to a predetermined condition relating to a relationship between the speed information and the content information.

Accordingly, the present invention provides an advantageous effect for a terminal device, which is associated with a vehicle moving on roads, to download contents without causing degradation of communication quality.

DETAILED DESCRIPTION OF THE PREFERRED EMBODIMENTS OF THE PRESENT INVENTION

[A] Configuration Example of Communication System

Figure 1:
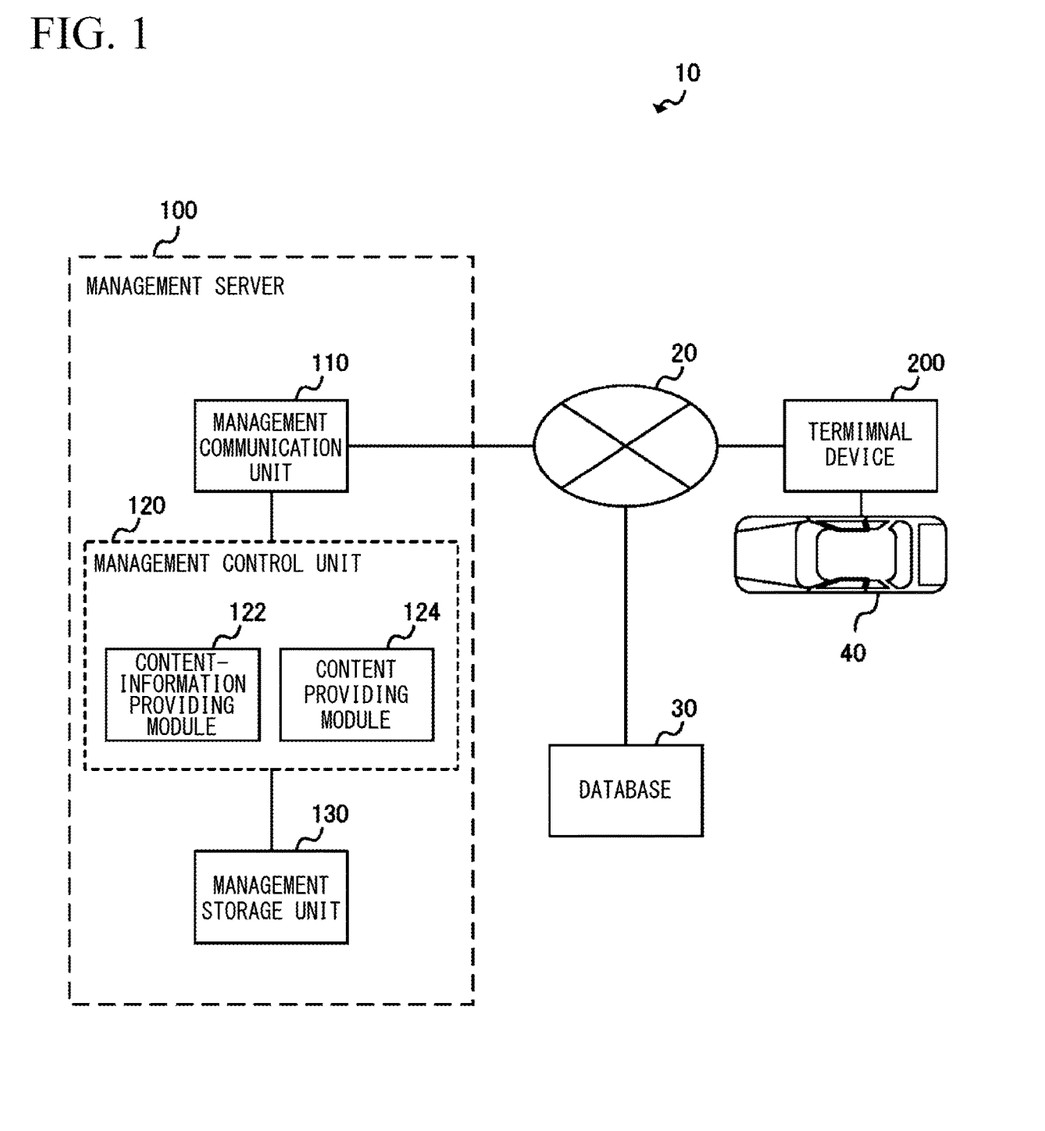
FIG. 1 is a block diagram showing a configuration example of a communication system including a management server configured to communicate with a terminal device mounted on a vehicle according to the exemplary embodiment of the present invention.

FIG. 1 shows a configuration example of a communication system 10 according to the exemplary embodiment of the present invention, which includes a network 20, a database 30, a vehicle 40, a management server 100, and a terminal device 200. The communication system 10 is designed to provide downloadable content information to the terminal device 200 mounted on the vehicle 40 such that the terminal device 200 can download contents from the management server 100 when the terminal device 200 is located in a specific area.

The management server 100 and the terminal device 200 can communicate with each other through the network 20. Since the network 30 is connected to the database 30, it is preferable for the management server 100 and the terminal device 200 to communicate with the database 30. For example, the network 20 is configured of the Internet.

The database 30 is configured to store a large amount of data including content information usable with the terminal device 200. The database 30 may provide content information according to a request from the management server 100. For example, the database 30 is configured of a server, a storage device, or the like.

According to a request from the terminal device 200, the management server 100 will transmit various types of information to the terminal device 200. The management server 100 includes a management communication unit 110, a management control unit 120, and a management storage unit 130.

The management communication unit 110 is coupled with the network 20 and configured to communicate with the database 30, the terminal device 200, and the like. The management communication unit 110 serves as a communication interface configured to conduct communication through the network 20.

The management control unit 120 is configured to control various parts of the management server 100. For example, the management control unit 120 may control the management communication unit 110 to receive a request from the terminal device 200 and to transmit to the terminal device 200 a response to the received request. The management control unit 120 may be configured of a CPU or the like. The management control unit 120 includes a content-information providing module 122 and a content providing module 124.

The content-information providing module 122 is configured to provide to the terminal device 200 the content information responsive to a request from the terminal device 200. In this connection, the content information represents a capacity of content downloadable from the management server 100. The content information may further represent an estimated throughput when downloading contents from the management server 100. The content information refers to a single content or multiple contents.

According to a request from the terminal device 200, the content providing module 124 may provide contents corresponding to the content information. That is, the content providing module 124 may transmit to the terminal device 200 the content data corresponding to the content information stored on the management storage unit 130 or the database 30. In this connection, contents may refer to moving images, map information, and other data for displaying advertisements as well as various programs for executing applications, games, and the like.

The management storage unit 130 is configured to store contents to be provided to the terminal device 200 mounted on the vehicle 40. The management storage unit 130 is configured to store content information, content data, estimated throughputs when downloading contents, and other information. The management storage unit 130 may store parameters, reference values, threshold values, calculation results, and any other intermediate data which are produced or used during the operation of the management server 100. In addition, the management storage unit 130 may supply its stored data to sources of making requests according to requests from various parts of the management server 100.

When a computer serves as the management server 100, for example, the management storage unit 130 may store various types of software such as an operating system (OS) for functioning the computer, programs, and other types of information. In addition, the management storage unit 130 may store various pieces of information such as databases which will be referred to when executing programs. For example, a CPU may serve as the management control unit 120 when executing programs stored on the management storage unit 130.

For example, the management storage unit 130 may include ROM (Read-Only Memory) for storing BIOS (Basic Input/Output System) in a computer or the like and RAM (Random-Access Memory) serving as working areas. The management storage unit 130 may include large-capacity storage units such as HDD (Hard-Disk Drive) and/or SSD (Solid-State Drive). In addition, the computer may further include a GPU (Graphics Processing Unit) or the like.

The terminal device 200 mounted on the vehicle 40 is configured to communicate with the management server 100 through the network 20. The terminal device 200 is configured to display various types of contents, which are downloaded from the management server 100 responsive to user operations, such as moving images, map information, advertisements, applications, and games. The terminal device 200 is configured to acquire various control information such as speed of the vehicle 40 in communication with electronic control units installed in the vehicle 40. For example, the terminal device 200 is configured of a smartphone, a tablet PC, a mobile PC, or the like. In this connection, the terminal device 200 may be configured of a communication module installed in the vehicle 40.

The terminal device 200 having the aforementioned configuration may access radio-communication networks such as mobile-phone networks to communicate with the management server 100. While the vehicle 40 equipped with the terminal device 200 is traveling on roads, the terminal device 200 may pass through multiple base stations as accessing facilities. In this case, for example, the terminal device 200 moves from one cell representing a communication-enabled area of one base station to another cell covered by another base station; hence, the terminal device 200 should change its link from one base station currently making a communication thereof to another base station corresponding to a moving destination. As such, the operation of the terminal device 200 to change its serving base station to another base station is called "handover".

As the moving speed of the vehicle 40 becomes higher when moving on roads, the number of times of making handover will be increased correspondingly. Due to improvement of convenience in the vehicle 40, an amount of usable contents in the vehicle 40 tends to be increased in capacity, which in turn increases a download time for downloading contents; hence, the number of times of making handover will be increased irrespective of the moving speed of the vehicle 40 which is not so high.

Due to a high probability of causing handover with the terminal device 200 while downloading contents from the management server 100, communication quality may be degraded instantaneously due to the occurrence of useless data transfer. In addition, communication quality may be degraded due to the occurrence of doppler shift at higher speed of the vehicle 40 (which is called "phasing"). Moreover, higher speed of the vehicle 40 when moving on roads may increase the probability of shields being located between the vehicle 40 and its serving base stations, thus degrading communication quality (which is called "shadowing").

Degradation of communication quality may reduce a throughput in data transfer between the management server 100 and the terminal device 200, thus incapacitating users to appropriately use contents or increasing loads to communication infrastructures. The exemplary embodiment is designed to reduce degradation of communication quality in a simple manner when the terminal device 200 mounted on the vehicle 40 while moving on roads attempts to receive contents. The details of the terminal device 200 adapted to the communication system 10 will be described below.

[B] Configuration Example of Terminal Device 200

Figure 2:
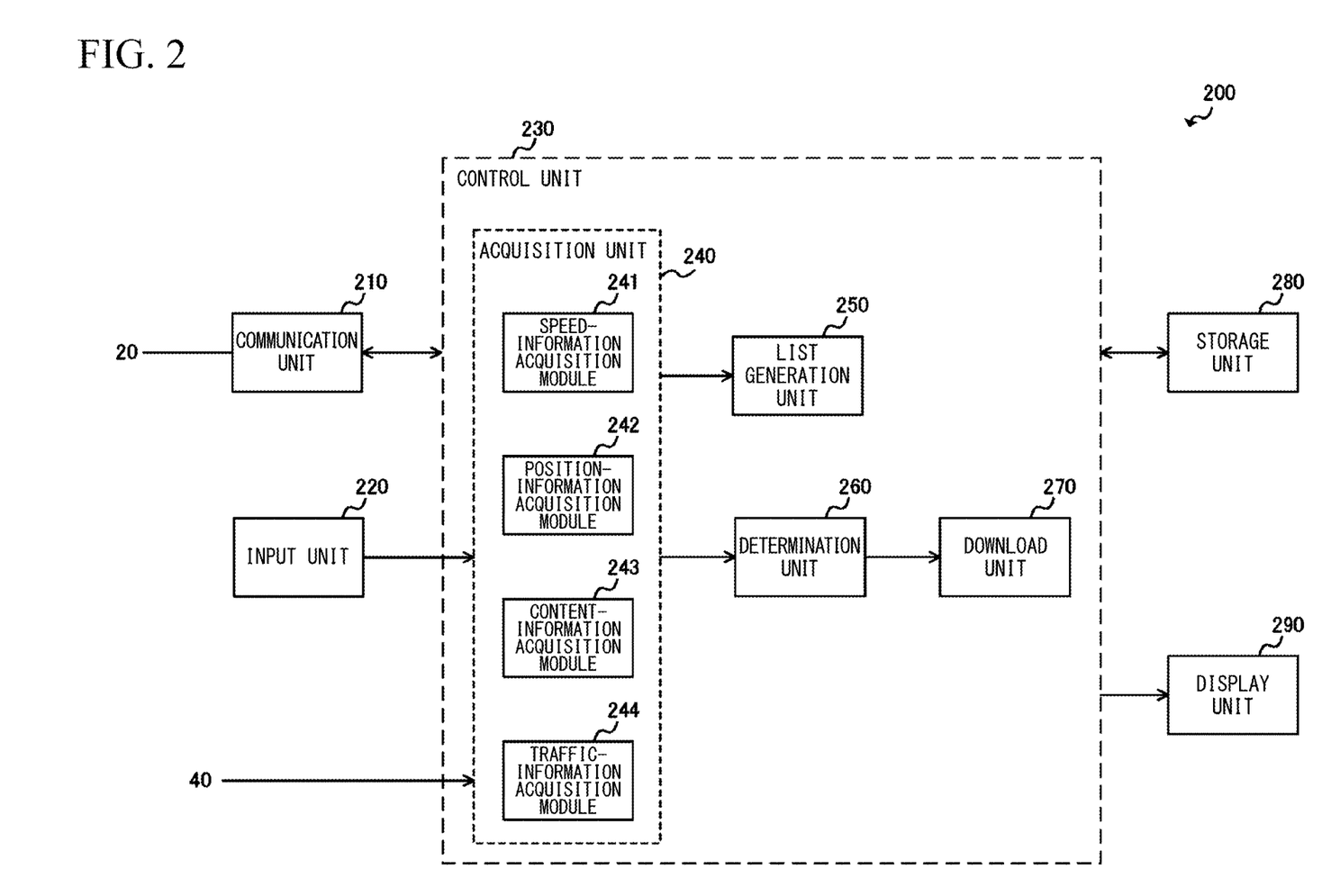
FIG. 2 is a block diagram showing a configuration example of the terminal device according to the exemplary embodiment of the present invention.

FIG. 2 shows a configuration example of the terminal device 200 according to the exemplary embodiment of the present invention. The terminal device 200 includes a communication unit 210, an input unit 220, a control unit 230, a storage unit 280, and a display 290.

The communication unit 210 is configured to communicate with the database 30 and the management server 100 through the network 20. For example, the communication unit 210 includes a radio-communication controller to access base stations in mobile-phone networks. In this case, the communication unit 210 may be connected to the network 20 when accessing base stations so as to implement a function as a communication interface for making a communication via the network 20.

The input unit 220 is configured to input the content information which users prefer to use. For example, the input unit 220 is operated by a user to selectively input various contents such as two-dimensional or three-dimensional map information representing routes towards destinations, music and/or videos which the user want to hear or watch, games which the user wants to play, and applications which the user wants to execute. For example, the user may be a driver or a passenger who may ride on the vehicle 40. For example, the input unit 220 may include any input devices such as a touch panel, a controller, a mouse, and a keyboard. When the input unit 220 is configured of a touch panel, it is preferable that the input unit 220 form part of the display 290.

The control unit 230 is configured to control various parts of the terminal device 200. For example, the control unit 230 may control the communication unit 210 to receive data from or to transmit data to the management server 100. In addition, the control unit 230 may control the input unit 210 to obtain a user's input. The control unit 230 may control the storage unit 280 and the display 290 to store the contents downloaded from the management server 100 on the storage unit 280 while displaying the contents on the display 290. Alternatively, the control unit 230 may execute the contents downloaded from the management server 100. For example, the control unit 230 is configured of a CPU or the like. Specifically, the control unit 230 includes an acquisition unit 240, a list generation unit 250, a determination unit 260, and a download unit 270.

The acquisition unit 240 is configured to acquire data to be used by the control unit 230. For example, the acquisition unit 240 is configured to acquire the information representing contents which the user may select by operating the input unit 220. The acquisition unit 240 is configured to acquire file names, IDs, and titles of contents via the input unit 220. In this connection, the acquisition unit 240 configured to acquire various pieces of information includes a speed-information acquisition module 241, a position-information acquisition module 242, a content-information acquisition module 243, and a traffic-information acquisition module 244.

The speed-information acquisition module 241 is configured to acquire the speed information representing the moving speed of the vehicle 40 from electronic control units installed in the vehicle 40. The position-information acquisition module 242 is configured to acquire the position information representing the position of the terminal device 200. For example, the position-information acquisition module 242 is configured to acquire from electronic control units installed in the vehicle 40 the position information according to signals received by a GPS (Global Positioning System) receiver mounted the vehicle 40. When the communication unit 210 is equipped with a GPS receiver, the position-information acquisition module 242 may acquire from the communication module 210 the position information according to signals received by the GPS receiver.

The content-information acquisition module 243 is configured to receive the content information from the management server 100. The traffic-information acquisition module 244 is configured to acquire the traffic information including the lighting status of signals disposed along roads on which the vehicle 40 is running. For example, the traffic-information acquisition module 244 may acquire from electronic control units of the vehicle 40 the traffic information according to signals received with a communication module mounted on the vehicle 40 such as an ITS (Intelligent Transport Systems).

The list generation unit 250 is configured to generate a content list representing contents scheduled to be downloaded. When the acquisition unit 240 acquires multiple contents via the input unit 220, the list generation may generate a content list including multiple contents.

The determination unit 260 is configured to determine whether or not the terminal device 200 is located in a specific area determined in advance based on the position information acquired by the position-information acquisition module 242. In this connection, the determination unit 260 may determine whether or not the terminal device 200 enters into a specific area based on the position information. Herein, the specific area is located to enable a continuous communication with the management server 100 without making handover with the terminal device 200.

For example, the specific area may be substantially identical to a communication-enabled range of the terminal device 200 communicating with a single base station. For example, the communication-enabled range of the terminal device 200 with a single base station may be equivalent to a 5G-communication cell or a MEC (Multi-access Edge Computing) cell.

It is preferable that the specific area be smaller than the communication-enabled range of the terminal device 200 with a single base station. In this case, a geographical boundary is virtually set using the position information in advance; hence, the specific area may fall within a virtual-boundary area partitioned using borderlines. The specific area is set according to a known technique called "geofence", the detailed description thereof being omitted here.

While the position indicated by the position information is included in the specific area which is determined in advance, the download unit 270 is configured to download contents specified by the content information from the management server 100 when the relationship between the moving speed of the vehicle 40 indicated by the speed information and the capacity of contents indicated by the content information meets a predetermined condition. The download unit 270 is configured to download contents when it is predicted that contents can be completely downloaded while the vehicle 40 is located in the specific area. The detailed operation of the download unit 270 will be discussed later.

The storage unit 280 is configured to store content data downloaded by the download unit 270. This makes it possible for the control unit 230 to read and use content data stored on the storage unit 280. The storage unit 280 may store parameters, reference values, threshold values, calculation results, intermediate data, and the like which are produced or used in the operating process of the terminal device 200. For example, the storage unit 280 may store the information of the specific area and the performance values such as throughputs. In addition, the storage unit 280 may provide its stored data to a request source responsive to a request from various parts of the terminal device 200.

When a computer is used to implement the function of the terminal device 200, for example, the storage unit 280 may store various pieces of information such as programs and the operating system (OS) for functioning the computer. In addition, the storage unit 280 may store various pieces of information including databases which will be referred to when executing programs. For example, a CPU of a computer may serve as the control unit 230 by executing programs stored on the storage unit 280.

For example, the storage unit 280 may include ROM (Read-Only Memory) for storing BIOS (Basic Input/Output System) for a computer and RAM (Random-Access Memory) serving as working areas. In addition, the storage unit 280 may include large-scale storage units such as HDD (Hard-Disk Drive) and/or SSD (Solid-State Drive). In addition, the computer may further include a GPU (Graphics-Processing Unit).

The display 290 is configured to display various types of contents such as images for assisting the input operation of the input unit 220, results of executing applications with the terminal device 200, videos, and the like. The display 290 may be a display integrally combined with the terminal device 200. Instead, it is possible to provide an independent display as the display 290 independently of the terminal device 200. The display 290 may be a display unit installed inside the vehicle 40.

The terminal device 200 having the aforementioned configuration is configured to predict a period of time in which the terminal device 200 is located in the specific area enabling a continuous communication with the management server 100 without causing handover, and therefore the terminal device 200 may download contents which can be downloaded completely within the predicted period of time. This may reduce a probability of causing handover when the terminal device 200 receives contents, thus reducing degradation of communication quality in a communication with the management server 100. The detailed operation of the communication system 10 will be described below.

[C] Sequence Example of Communication System 10

Figure 3:
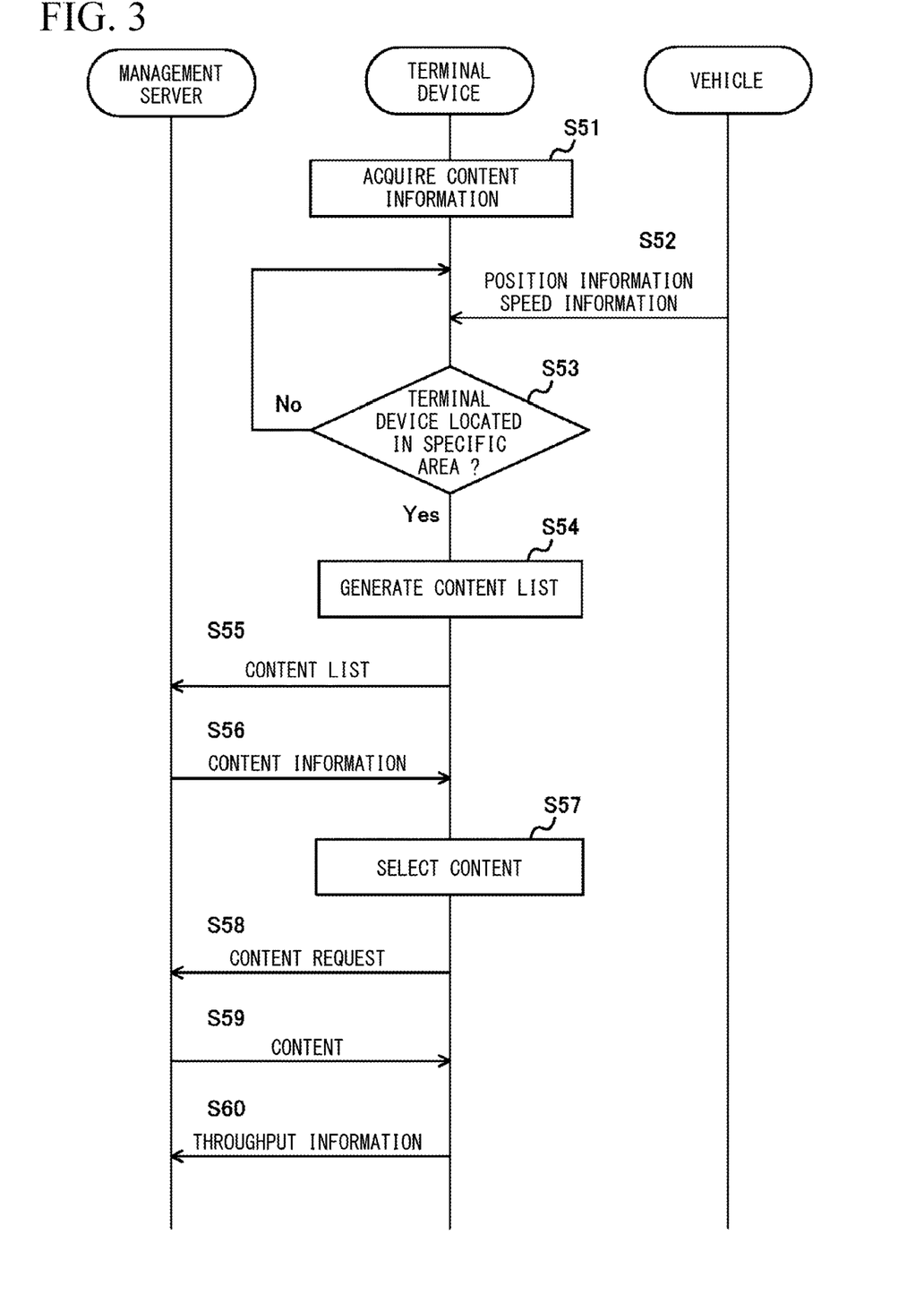
FIG. 3 is a sequence diagram showing a flow of processing implemented by the communication system according to the exemplary embodiment of the present invention.

FIG. 3 is a sequence diagram showing a flow of processing implemented by the communication system 10 according to the exemplary embodiment of the present invention (i.e., steps S51 through S60). FIG. 3 shows a sequence example in which a user riding on the vehicle 40 selects content to be used in the vehicle 40 in an attempt to use and download the content from the management server 100.

First, the acquisition unit 240 acquires the information of content which a user riding on the vehicle 40 wants to use (S51). The acquisition unit 240 acquires the information of content input to the input unit 220. The exemplary embodiment will be explained with respect to a scenario in which the user selects the names of multiple contents so as to input them into the input unit 220 such that the acquisition unit 240 can acquire the information about multiple contents. In this connection, multiple contents whose information is acquired by the acquisition unit 240 will be regarded as contents scheduled to be downloaded.

Next, the speed-information acquisition module 241 acquires the speed information representing the moving speed of the vehicle 40 from electronic control units of the vehicle 40, while the position-information acquisition module 242 acquires the position information representing the position of the terminal device 200 from electronic control units of the vehicle 40 (S52)

Next, the determination unit 260 determines whether or not the terminal device 200 is located in the specific area which is determined in advance based on the position information acquired by the position-information acquisition module 242 (S53). For example, the determination unit 260 determines whether or not the terminal device 200 is located in the specific area or whether or not the terminal device 200 enters into the specific area upon comparing the position of the terminal device 200 with the information of the specific area stored on the storage unit 280.

When the terminal device 200 is located outside of the specific area (i.e., S53, NO), the flow returns to step S52 in which the acquisition unit 240 acquires the speed information and the position information. In this connection, the speed-information acquisition module 241 and the position-information acquisition unit 242 may acquire the speed information and the position information after the lapse of a predetermined time. For example, the predetermined time is set to one second or so. While the terminal device 200 is located outside of the specific area, the acquisition unit 240 may continue an operation to acquire the content information which the user inputs to the input unit 220.

When the terminal device 200 is located inside of the specific area (i.e., S53, YES), the list generation unit 250 generates a content list representing contents to be downloaded, which are acquired by the acquisition unit 240 (S54). For example, the content list may describe various pieces of information such as types, IDs, and names of contents.

Next, the communication unit 210 transmits to the management server 100 the content list generated by the list generation unit 250 (S55). In other words, the terminal device 200 requests the management server 100 to reply to the content information corresponding to contents described on the content list by transmitting the content list to the management server 100.

The management communication unit 110 of the management server 100 receives the content list transmitted from the terminal device 200. Subsequently, the content-information providing module 122 of the management control unit 120 searches through the management storage unit 130 and the database 30 to acquire a capacity of contents described on the content list. The content-information providing module 122 transmits to the terminal device 200 the content information representing the content list added with the capacity of contents (S56). In this connection, the content-information providing module 122 may include in the content information the estimated throughputs when downloading contents.

Accordingly, the communication unit 210 of the terminal device 200 receives the content information representing the capacity of contents described on the content list, and therefore the content-information acquisition module 243 of the acquisition unit 240 acquires the content information from the management server 100. Subsequently, the download unit 270 may select "downloading contents", which should be downloaded while the vehicle 40 is located in the specific area, as one or more contents among multiple contents based on the moving speed of the vehicle 40 and the capacity of contents indicated by the content information (S57).

For example, the download unit 270 may select from multiple contents a downloading content having a smaller capacity than the multiplication result produced by multiplying the estimated moving time and the estimated throughput. In this connection, the download unit 270 calculates the estimated moving time as a period of time needed for the vehicle 40 to move out of the specific area when moving at the moving speed acquired by the speed-information acquisition module 241. It is preferable for the download unit 270 to calculate the estimated moving time when it is determined that the vehicle 40 is located in the specific area or that the vehicle 40 enters into the specific area.

When the content-information acquisition module 243 acquires the content information including the estimated throughput, the download unit 270 may use the estimated throughput. Alternatively, the download unit 270 may use the estimated throughput as the previous performance of throughputs stored on the storage unit 280, a predicted value of throughputs in the specific area, or the like.

Due to the existence of multiple contents each having a smaller capacity than the result of multiplying the estimated moving time and the estimated throughput, the download unit 270 selects the downloading content (which should be downloaded) as content having a largest capacity among multiple contents. Alternatively, the download unit 270 may select a series of contents which are aligned in an order of larger capacities among multiple contents (each having a small capacity than the multiplication result) such that the total amount of capacities of the selected contents will not exceed the multiplication result, thus selecting a series of downloading contents (which should be downloaded). Instead, the download unit 270 may select a combination of contents among multiple contents such that the total amount of capacities of the selected contents becomes less than the multiplication result but approximates the multiplication result, thus selecting a combination of downloading contents (which should be downloaded).

Next, the download unit 270 transmits the information of the selected content(s) to the management server 100, thus requesting the management server 100 to download the selected content(s) (S58). The download unit 270 transmits to the management server 100 multiple pieces of information such as the ID and the name of the content. Responsive to a download request from the terminal device 200, the content providing module 124 of the management server 100 transmits the date of the selected content to the terminal device 200 (S59). The download unit 270 stores the downloaded content data on the storage unit 280. Accordingly, it is possible for the control unit 230 to carry out the content input by the user in the vehicle 40.

After completion of downloading the content, the download unit 270 transmits to the management server 100 the download time as the performance information of throughputs (S60). The management control unit 120 receives and stores the performance information of throughputs on the management storage unit 130. The management control unit 120 may update the performance information of throughputs by overwriting the previous performance information with the new performance information. Alternatively, the management control unit 120 may update the performance information of throughputs by calculating an average value of previous throughputs or by calculating a weighted value for weighting previous throughputs.

As described above, the communication system 10 is configured to calculate an estimated moving time as a period of time in which the vehicle 40 may move in the specific area, thus selecting and downloading contents when it is predicted that those contents can be completely downloaded in the estimated moving time. Accordingly, it is possible for the communication system 10 to improve a probability in which the terminal device 200 can completely download contents while the vehicle 40 is located in a single specific area when the vehicle 40 is stopped or moving at low speed. This makes it possible for the communication system 10 to download contents with the terminal device 200 mounted on the vehicle 40 (during its moving) while reducing degradation of communication quality.

The sequence diagram of FIG. 3 refers to an example in which the user may input multiple contents via the input unit 220; but this is not a restriction. For example, the user may input a single content via the input unit 220. In this case, it is possible to omit a process of the download unit 270 to select downloading contents among multiple contents in step S57.

In addition, the terminal device 200 may download from the management server 100 any contents, which are not necessarily limited to contents used by the user. The terminal device 200 may download programs and data upon upgrading programs causing any devices mounted on the vehicle 40 to operate in the communication system 10. In this case, the list generation unit 250 may add to the content list a certain set of contents needed for execution of applications, system management of the control unit 230, and the like.

Moreover, it is possible to add to the content list the downloading contents which should be downloaded from the management sever 100. For example, the management server 100 may download to the terminal device 200 advertisements, road information, and weather information as well as data and programs used to update the existing programs. In this case, the content-information providing module 122 of the management server 100 may add the downloading contents and their capacity information to the content list, which will be transmitted to the terminal device 200 as the content information.

[D] Example of Content List

Figure 4:
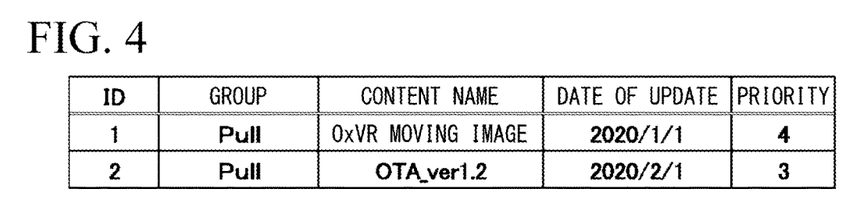
FIG. 4 shows an example of a content list generated by a list generation unit of the terminal device.

FIG. 4 shows an example of a content list generated by the list generation unit 250 included in the control unit 230 of the terminal device 200. The list generation unit 250 generates a table form of a content list describing various items such as ID, GROUP, CONTENT NAME, and DATE OF UPDATE with respect to contents. FIG. 4 shows two types of groups such as "Pull" representing the content requested to the management server 100 from the vehicle 40 and "Push" representing the content to be provided from the management server 100 to the vehicle 40.

In addition, FIG. 4 shows an example of the table form describing priorities representing numbers such as "4" and "3". For example, a first content relating to the operation of the communication system 10 and the vehicle 40 is given a higher priority indicating a higher degree of importance; hence, the list generation unit 250 sets a higher priority to the first content. In addition, the list generation unit 250 may assign a next higher priority to a second content relating to a road status and weather to be presented to a driver of the vehicle. The list generation unit 250 may assign a low priority to a third content relating to entertainments such as videos, music, and games.

[E] Example of Content Information

Figure 5:
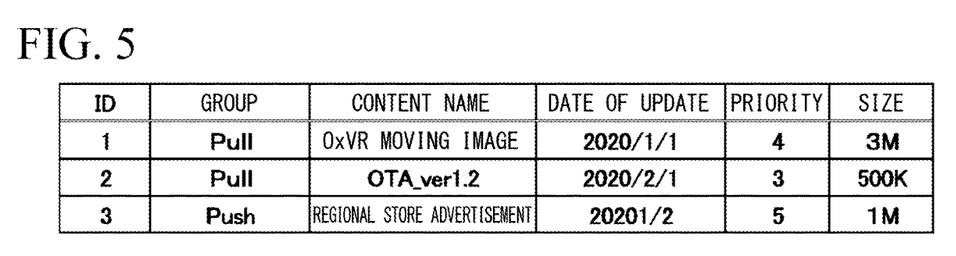
FIG. 5 shows an example of content information provided by a content-information providing module of the management server.

FIG. 5 shows an example of the content information provided by the content-information providing module 122 of the management server 100. FIG. 5 shows an example of the content information which is transmitted to the terminal device 200 via the content-information providing module 122 upon receiving the content list shown in FIG. 4. Specifically, the content-information providing module 122 provides a table form of the content information which is produced by adding the capacity of contents (e.g., SIZE in units of bytes) to the content list of FIG. 4. In FIG. 5, the content-information providing module 122 adds to the content list a set of records describing "REGIONAL STORE ADVERTISEMENT" as its content name, which indicates another downloading content which should be downloaded from the management server 100.

As described above, the download unit 270 selects a downloading content based on the content information. When the result of multiplying the estimated moving time and the estimated throughput exceeds 3 M bytes, for example, the download unit 270 selects and downloads the content having ID="1" from the management server 100. When the result of multiplying the estimated moving time and the estimated throughput exceeds 4M byes, the download unit 270 may select and download the contents having ID="1" and ID="3" from the management server 100. When the result of multiplying the estimated moving time and the estimated throughput exceeds 4.5M bytes, the download unit 270 may select and download the contents having IDs ranging from "1" to "3" from the management server 100.

Since the content information of FIG. 5 includes the priority for each content, the download unit 270 may download a specific content which is specified according to the capacity and priority for each content among multiple contents which can be downloaded by the terminal device 200 while the vehicle 40 stays in the specific area. For example, the download unit 270 may specify and download content having a highest priority among multiple contents each having a smaller capacity than the result of multiplying the estimated moving time and the estimated throughput.

Even when the result of multiplying the estimated moving time and the estimated throughput exceeds 3M bytes, for example, the download unit 270 may select and download the content having ID="2". In addition, the download unit 270 may select and download the contents having ID="1" and ID="2" when the result of multiplying the estimated moving time and the estimated throughput exceeds 4M bytes. Accordingly, it is possible for the user to promptly use more important contents since the terminal device 200 preemptively downloads contents having higher priorities among multiple contents each having a small capacity.

In the foregoing embodiment, the terminal device 200 is designed such that the download unit 270 calculates the estimated moving time representing a period of time until the vehicle 40 moves out of the specific area based on the moving speed of the vehicle 40; but this is not a restriction. As described above with reference to FIG. 2, the acquisition unit 240 includes the traffic-information acquisition module 244 configured to acquire the traffic information including the lighting status of signals disposed on roads, and therefore the download unit 270 may determine the estimated moving time of the vehicle 40 based on the traffic information.

When the moving speed of the vehicle 40 becomes lower than a threshold value on the condition that the traffic information includes a stop instruction of a signal on a road, for example, the download unit 270 may measure the estimated moving time as a duration to keep a stop instruction of a signal indicated by the traffic information. The vehicle 40 may stop at a signal flashing red and keep its stopped condition until the signal turns green; hence, it is possible to accurately predict the duration to keep the stopped condition of the vehicle 40 by acquiring the flashing condition of a signal indicated by the traffic information.

In the terminal device 200 according to the exemplary embodiment, the download unit 270 is configured to select a downloading content using the estimated throughput, wherein the estimated throughput may be determined for each specific area. For example, it is preferable that the estimated throughput be a statistical value produced by statistically analyzing throughputs with respect to a frequency band of a communication device of the vehicle 40, the number of antennas, performance for each generation of communication, the position of the specific area, communication time, and each server configured to store contents. In addition, it is possible to perform weighted addition of statistical values upon extracting various pieces of information such as download time and un-completed sizes of data from the results of actually downloading contents with the terminal device 200.

In the terminal device 200 according to the exemplary embodiment, the download unit 270 is configured to download contents from the management server 100 when the relationship between the moving speed of the vehicle 40 and the capacity of contents satisfies a predetermined condition since the position information represents a certain position included in the specific area which is determined in advance. However, it is likely that the vehicle 40 may move at high speed due to changing traffic conditions of roads after the download unit 270 starts downloading contents.

For this reason, the download unit 270 may temporarily suspend downloading contents when the moving speed of the vehicle 40 exceeds a threshold value or the acceleration of the vehicle 40 exceeds a threshold value during a process of downloading contents. Thus, it is possible to reduce an increase in loads to communication infrastructures when the terminal device 200 continues downloading contents irrespective of a reduction of throughputs in data transfer.

In the communication system 10 according to the exemplary embodiment, the terminal device 200 is configured to download contents based on the moving speed of the vehicle 40 and the capacity of contents indicated by the content information: but this is not a restriction. Instead or additionally, the management server 100 may determine whether or not to provide contents to the terminal device 200. A modification of the communication system 10 will be described below.

[F] Modification of Communication System 10

Figure 6:
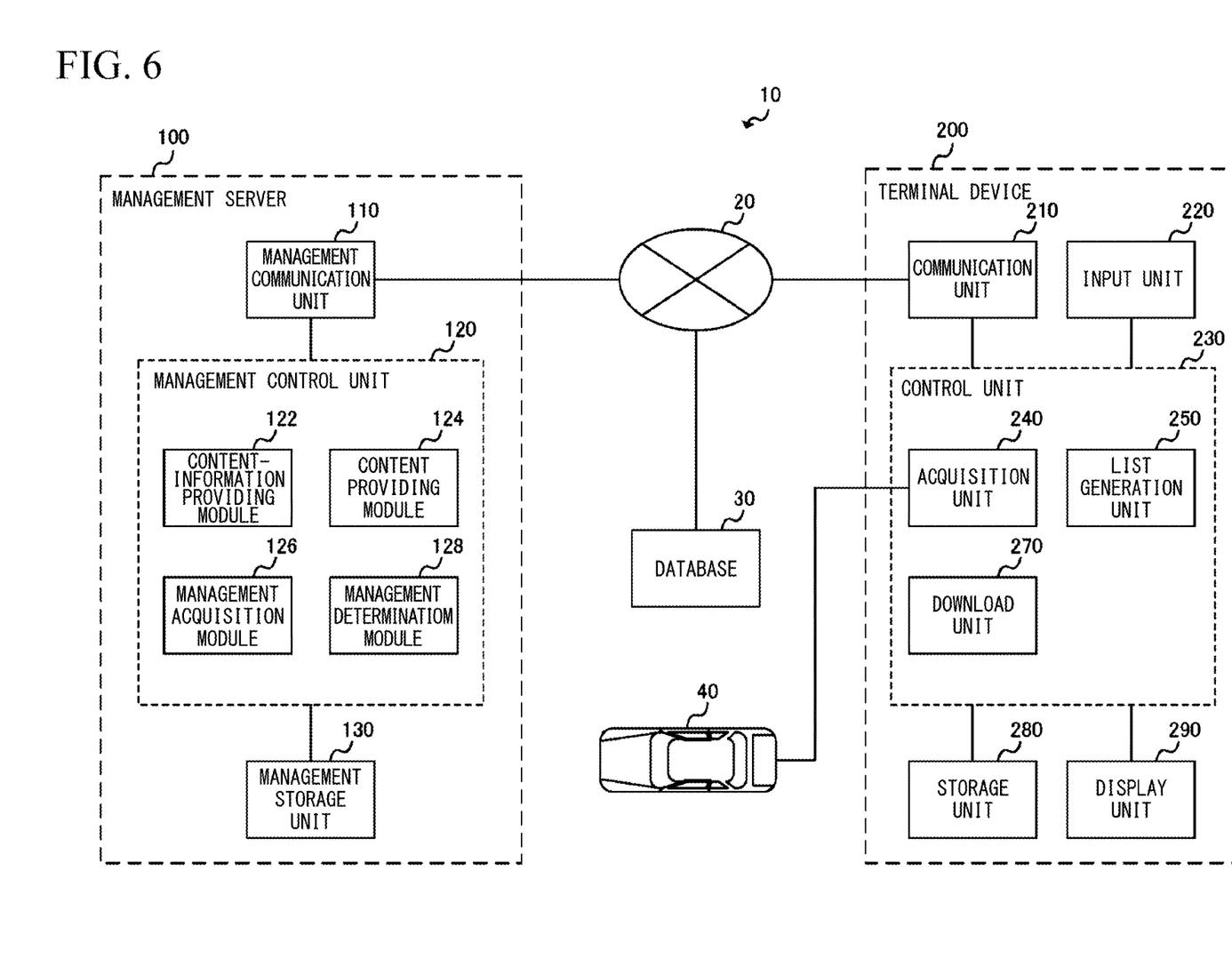
FIG. 6 is a block diagram showing a modification of the communication system according to the exemplary embodiment of the present invention.

FIG. 6 shows a modification of the communication system 10 according to the exemplary embodiment. In the communication system 10 shown in FIG. 6, the same constituent parts will be designated by the same reference signs with respect to the operation of the communication system 10 shown in FIG. 1 and the operation of the terminal device 200 shown in FIG. 2; hence, duplicate descriptions thereof will be omitted here. According to the modification of the exemplary embodiment, the management server 100 further includes a management acquisition module 126 and a management determination module 128.

The management acquisition module 126 is configured to acquire from the terminal device 200 the speed information representing the moving speed of the vehicle 40 and the position information representing the position of the terminal device 200. In other words, the management acquisition module 126 operates similarly to the speed-information acquisition module 241 and the position-information acquisition module 242 of the terminal device 200 which are described above with reference to FIG. 2. In this connection, the management acquisition module 126 may operate similarly to the traffic-information acquisition module 244 configured to acquire the traffic information from the terminal device 200.

The management determination module 128 is configured to determine whether or not the terminal device 200 is located in the specific area (which is determined in advance) based on the position information acquired by the management acquisition module 126. In other words, the management determination module 128 operates similarly to the determination unit 260 of the terminal device 200 which is described above with reference to FIG. 2. Therefore, the terminal device 200 can be modified not to include the determination unit 260.

Accordingly, the content providing module 124 of the management server 100 is configured to provide contents to the terminal device 200 when the relationship between the speed information representing the moving speed of the vehicle 40 and the capacity of contents satisfies a predetermined condition since the position information represents the position included in the specific area (which is determined in advance). In other words, the content providing module 124 operates similarly to the download unit 270 of the terminal device 200 which is described above with reference to FIG. 2. Therefore, the download unit 270 of the terminal device 200 is modified to download contents provided by the content providing module 124 of the management server 100.

In the communication system 10 according to the aforementioned modification of the exemplary embodiment, the management server 100 is configured to determine whether or not to provide contents to the terminal device 200 based on the position information, the speed information, and the capacity of contents. The management server 100 may determine whether or not to provide contents to the terminal device 200 additionally using the traffic information. Similar to the communication system 10 which is described above with reference to FIG. 1 through FIG. 3, the communication system 10 according to the modification of the exemplary embodiment allows the terminal device 200 (which is mounted on the vehicle 40 while moving on roads) to download contents while reducing degradation of communication quality.

In this connection, the communication system 10 of FIG. 6 may include the terminal device 200 of FIG. 2. That is, the communication system 10 can be designed such that the management server 100 may provide contents to the terminal device 200 while the terminal device 200 may download contents. In this case, it is possible for the communication system 10 to determine whether the management server 100 may provide contents while the terminal device 200 may download contents according to type of contents or the group of contents.

For example, the management server 100 may provide contents (which are handled by the management server 100) such as applications, programs, data, and advertisements relating to the communication system 10, while the terminal device 200 may download contents which are handled by the terminal device 200 and/or electronic control units of the vehicle 40. In this connection, the management server 100 may provide contents belonging to a group of "Push" while the terminal device 200 may download contents belonging to a group of "Push". Instead, the management server 100 may provide contents (e.g., applications handled by the management server 100) belonging to a group of "Push" while the terminal device 200 may download other contents.

In general, either the management server 100 or the terminal device 200 is configured to manage or process contents. Therefore, it is possible to appropriately extract or instruct downloading contents (which should be downloaded) upon changing a decision as to whether the management server 100 should provide contents or whether the terminal device 200 should download contents with respect to each type of contents or each group of contents.

The exemplary embodiment and its modification are designed based on a precondition that the terminal device 200 is mounted on the vehicle 40 and configured to communicate with the management server 100 through the network 20; but this is not a restriction. That is, the terminal device 200 is not necessarily mounted on the vehicle 40 but provided independently of the vehicle 40 such that the terminal device 200 can wirelessly communicate with electronic control units installed in the vehicle 40 to obtain the speed information of the vehicle 40 as well as the position information of the vehicle 40 while wirelessly communicating with the management server 200 through the network 20.

Heretofore, although the present invention has been described above in conjunction with the exemplary embodiment and its modification, the technological scope of the invention should not be necessarily limited to the scope of the exemplary embodiment and its modification; hence, it is possible to contemplate various changes or modifications within the essence of the present embodiment. For example, the entirety or part of the aforementioned devices can be physically or functionally distributed or integrated in arbitrary units; hence, it is possible to contemplate a new embodiment upon combining the aforementioned units and modules, which should be embraced by the present invention. In this connection, a new embodiment using combinations of units and modules should offer advantageous effects shared by the foregoing embodiment and its modification.

While the preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A terminal device configured to communicate with a management server through a network in association with a vehicle, comprising:
   one or more memories that store a set of instructions; and
   one or more processors that execute the instructions to:
      acquire speed information representing a moving speed of the vehicle and position information representing a position of the terminal device;
      determine whether the position information represents the position located in a specific area which is determined in advance;
      download content from the management server when the position information indicates the position included in the specific area;
      receive from the management server content information representing a capacity of the content downloadable from the management server and an estimated throughput when downloading the content; and
      download the content corresponding to the content information according to a predetermined condition relating to a relationship between the capacity of the content and a result of multiplying the estimated throughput and an estimated moving time for the vehicle to move out of the specific area at the moving speed of the vehicle indicated by the speed information.

2. The terminal device according to claim 1, wherein the one or more processors are configured to execute the instructions to acquire the speed information of the vehicle, a position-information acquisition module configured to acquire the position information of the terminal device, and a content-information acquisition module configured to acquire the content information.

3. The terminal device according to claim 2, wherein when the content information represents the capacity of each content among a plurality of contents, the one or more processors are configured to execute the instructions to select at least one downloading content downloadable from the management server among the plurality of contents based on the speed information and the content information.

4. The terminal device according to claim 3, wherein the one or more processors are configured to execute the instructions to:
calculate the estimated moving time and
select the at least one downloading content having a capacity smaller than the result of multiplying the estimated moving time and the estimated throughput.

5. The terminal device according to claim 4, wherein the specific area allows the terminal device to continue its communication with the management server without causing handover, and wherein the one or more processors are configured to execute the instructions to calculate the estimated moving time when the vehicle enters into the specific area.

6. The terminal device according to claim 4, wherein the one or more processors are configured to execute the instructions to:
acquire traffic information representing a lighting status of a signal disposed on a road along which the vehicle moves and a stop instruction for stopping the vehicle indicated by the signal on the road, and
calculate the estimated moving time of the vehicle as a duration of the stop instruction indicated by the signal on the road when the moving speed of the vehicle becomes lower than a predetermined threshold value.

7. The terminal device according to claim 3,
wherein the content information includes a priority for each content among the plurality of contents, and
wherein the one or more processors are configured to execute the instructions to specify the at least one downloading content according to the capacity of each content and the priority indicated by the content information within the plurality of contents downloadable from the management server when the vehicle stays in the specific area.

8. The terminal device according to claim 3, wherein the one or more processors are further configured to execute the instructions to:
generate a content list describing the plurality of contents scheduled to be downloaded from the management server;
transmit the content list to the management server; and
acquire from the management server the content information representing the capacity for each content among the plurality of contents described on the content list.

9. The terminal device according to claim 3, wherein upon completion of downloading the content from the management server, the one or more processors are configured to execute the instructions to transmit a throughput performance as a download time needed to completely download the content from the management server.

10. A management server configured to communicate with a terminal device through a network in association with a vehicle, comprising:
one or more memories that store a set of instructions and a content to be provided to
the terminal device; and
one or more processors that execute the instructions to:
acquire from the terminal device speed information representing a moving speed of the vehicle and position information representing a position of the terminal device;
determine whether the position information represents the position located in a specific area which is determined in advance; and
provide the content to the terminal device according to a predetermined condition relating to a relationship between a capacity of the content and a result of multiplying an estimated throughput when downloading the content and an estimated moving time for the vehicle to move out of the specific area at the moving speed of the vehicle indicated by the speed information when the position information represents the position located in the specific area.

11. The management server according to claim 10, wherein the one or more processors are configured to execute the instructions to acquire the speed information and the position information, a management determination module configured to determine whether the position information represents the position located in the specific area, and a content providing module configured to provide the content to the terminal device according to the predetermined condition.

12. A terminal device configured to communicate with a management server through a network in association with a vehicle, comprising:
one or more memories that store a set of instructions; and
one or more processors that execute the instructions to:
acquire speed information representing a moving speed of the vehicle, position information representing a position of the terminal device, and traffic information representing a lighting status of a signal disposed on a road along which the vehicle moves;
determine whether the position information represents the position located in a specific area which is determined in advance;
download content from the management server when the position information indicates the position included in the specific area;
receive from the management server content information representing a capacity of the content downloadable from the management server; and
select the content downloadable when the vehicle stays in the specific area based on the speed information, the content information and the lighting status of the signal included in the traffic information, and download the content that is selected.

13. A management server configured to communicate with a terminal device through a network in association with a vehicle, comprising:
one or more memories that store a set of instructions and a content to be provided to the terminal device; and
one or more processors that execute the instructions to:
acquire from the terminal device speed information representing a moving speed of the vehicle and position information representing a position of the terminal device;
acquire traffic information representing a lighting status of a signal disposed on a road along which the vehicle moves;
determine whether the position information represents the position located in a specific area which is determined in advance; and select the content downloadable when the vehicle stays in the specific area based on the speed information, a capacity of the content and the lighting status of the signal included in the traffic information, and provide the content that is selected to the terminal device, when the position information represents the position located in the specific area.

\* \* \* \* \*